INVENTOR.
DONALD R. FAULIS
BY George L. Kensinger
AGENT

INVENTOR.
DONALD R. FAULIS
BY George L. Kensinger
AGENT

INVENTOR.
DONALD R. FAULIS
BY George L. Kensinger
AGENT

INVENTOR.
DONALD R. FAULIS
BY George L Kensinger
AGENT 3,505,656
Patented Apr. 7, 1970

3,505,656
INFORMATION STATIC STORAGE METHOD AND APPARATUS EMPLOYING DELAY LINES

Donald R. Faulis, Norristown, Pa., assignor to Burroughs Corporation, Detroit, Mich., a corporation of Michigan Filed May 24, 1965, Ser. No. 458,302
Int. Cl. G11c *7/00*
U.S. Cl. 340—174 26 Claims

ABSTRACT OF THE DISCLOSURE

An improved method of entering information signals into memory apparatus and improved magnetic memory apparatus for the storage of such signals. The memory apparatus disclosed includes lumped parameter signal delay lines, lumped parameter sense lines, and distributed parameter signal delay apparatus coupled to signal storage means. Information is entered into the apparatus by impressing a series of partial-select current signals upon the delay means.

The subject invention relates to the storage of information signals in memory apparatus as utilized in computing and control systems. More specifically, this invention provides an improved method of storing information signals and an improved static storage memory apparatus which incorporates delay line means for the presentation of signals to be stored. Apparatus embodying the present invention utilizes magnetic storage means having increased switching speed and provides improved control of the parameters and characteristics of the delay line means employed.

In most magnetic memory apparatus, permanent magnets having two different stable states of magnetization are utilized for storing binary signal representations. Information is entered into such magnetic storage apparatus by applying a magnetomotive force in one or the other of two opposite directions to the elements. When a sufficiently strong disruptive magnetomotive force is applied to such a unit, its magnetization switches and the element thereafter remains in the reversed direction of magnetization. The magnetic storage unit retains that signal-representing state until an opposite polarity magnetomotive force is applied for again reversing the magnetic dipoles, and thus the magnetic flux, in the material. This type of flux switching, has been effected most frequently in magnetic cores of varying configurations in the prior art.

In one device of the prior art, magnetic cores were threaded with a common conductor and grounded capacitors were connected to the conductor between each of the cores for providing a delay line-incorporated magnetic storage apparatus. Since each of the cores introduced a certain amount of inductance in the conductor, in addition to providing the means for magnetic storage, that conductor could be utilized for entering or writing an information signal into a selected magnetic core by impressing time displaced pulses of half-select switching magnitude upon each end of the conductor.

In another prior art core storage apparatus information signals were stored in a magnetic core around which was wrapped a single winding along most of its periphery. Several storage locations were designated along the core. Since a certain amount of distributed inductance and capacitance was inherent in this wrapped magnetic core configuration, it was possible to introduce selection pulses into each end of the winding at predetermined points in time for achieving the storage of a signal at a desired location in the magnetic core.

Examples of the prior art storage apparatus are illustrated in FIGS. 1 and 2 of N. C. Loeber, U.S. Patent No. 3,143,728, issued on Aug. 4, 1964. A disadvantage of the prior art data storage method was the complex driving apparatus required. The known memory apparatus included an extremely complicated series of delay and gating means connected to each end of the delay line of the memory device. Such driving means was expensive and defeated the compact feature of the memory device. A further limitation of the prior art apparatus was that magnetic storage was affected by switching the flux of square hysteresis loop material (called magnetic dipole switching in the art). Switching by that technique is relatively slow and thus limits the frequency response and therefore the useful length of the delay lines employed in the apparatus due to signal degradation.

A disadvantage of the prior art storage devices is that the amount of delay resulting from the inherent inductance of windings on one or more magnetic storage cores, especially when interwinding capacitance in the core storage configuration is also relied upon, is relatively small. Limited delay in such storage devices limits the density of storage locations in the apparatus and therefore tends to maintain the cost and bulk of such storage means relatively high. Limited delay per unit length of such storage devices also restricts the frequency response of the delay line circuit, which results in a high degradation of signal shape and magnitude within the line.

The use of one magnetic body for the different functions of controlling the inductance in the delay line circuit and of storing the information signals has restricted the choice of available materials in the prior art apparatus. This limitation has required the choice of a magnetic material that was either more suitable for storing electrical signals or more suitable for providing the desired amount of inductance. Many materials that would provide adequate inductance to the electric delay line circuit would be totally unsuitable for storing the information signals.

Accordingly, it is an object of this invention to greatly simplify driving apparatus for delay line-incorporated static storage memory apparatus and also to reduce the cost of such memories, both as to the bulk and complexity of the driving apparatus required and as to the expense of fabrication of the storage device.

Another object of this invention is to provide an improved driving method for storing information signals serially in a delay line-incorporated memory apparatus.

A further object of the subject invention is to increase the density of storage in memory devices incorporating delay line means and also to increase the frequency response of the delay lines employed in such memories.

A more specific object of this invention is to improve control of the inductance and capacitance and characteristic impedance of delay line means incorporated in serial static storage memory apparatus.

Another object of this invention is to provide a shielded distributed-parameter delay line unit for use in static storage memory apparatus.

A further object of this invention is to provide thin-film embodiments for delay line-incorporated memory apparatus in order to improve operation of such apparatus by increasing the switching speed of the storage units thereof.

In accordance with one aspect of the subject invention, a train of information-representing current pulses of magnitude insufficient to switch any storage location is formed and impressed upon a delay line to which storage means are distributively coupled. The period of the pulses in this train is proportional to the transit time between storage locations along the line. An enable-write current pulse of magnitude sufficient to cause any selected storage location to switch upon coincidence with an information pulse is then impressed upon the delay line in timed relation to the information pulse-train so as to coincide with the information pulses adjacent selected storage locations for storing the information.

In accordance with an embodiment of the invention, there is provided delay line-incorporated storage apparatus having magnetic storage means positioned along and coupled to a delay line. A first ferromagnetic material is utilized for storing information signals upon the coincidence of current pulses in the delay line coupled to the material and a second ferromagnetic material is utilized as inductor cores for establishing the desired inductance in the line.

In accordance with the preferred embodiment of the invention, static storage memory apparatus is provided comprising a layer of magnetizable material spaced apart from and between concentrically positioned conductive means and ferromagnetic core means. A winding is positioned upon the ferromagnetic core means and half-select information and enable-write current pulses are impressed between said winding and the conductive means at opposite ends thereof for storing information upon the coincidence of current pulses in the delay line adjacent selected storage locations.

In another embodiment of the delay line-incorporated static storage memory apparatus, a lamina of conductive material is positioned in spaced relation adjacent to a lamina of magnetizable material and a conductive coil is positioned around this assembly. Lead conductors are connected to opposite ends of the conductive lamina. Information signal drive means and enable-write signal drive means are connected between the coiled conductor and the lead conductors at opposite ends of the assembly for applying pulses for eventual coincidence in the device for storing information bits. Other objects and advantages of the invention as well as the detals of construction and operation will be apparent from the following detailed description, which may be read in connection with the accompanying drawings wherein:

Figure 1:
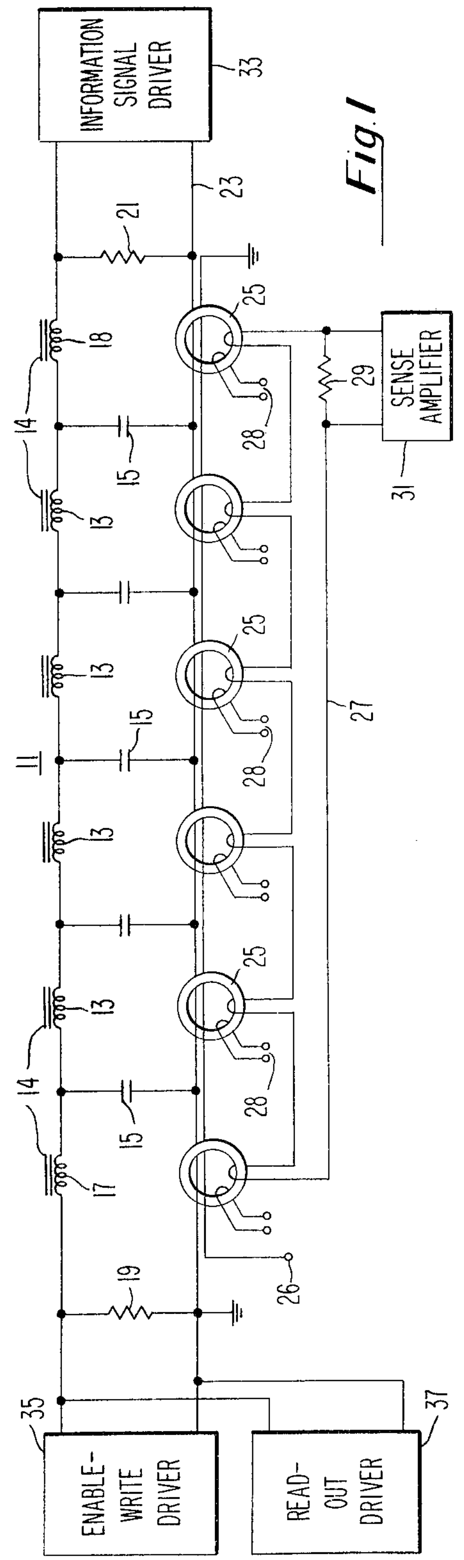
FIG. 1 is a schematic circuit diagram of one embodiment of the invention.

Referring to FIG. 1, a static storage delay line memory is therein seen to be constructed of a sectional delay line 11 with magnetic cores 25 individually magnetically coupled to the sections thereof. The sections of the delay line consist of lumped-parameter components including inductors 13 and capacitors 15. Inductors 13 are connected in a chain and terminal inductors 17 and 18 are connected to the ends of the inductor chain. Each of the inductors may have coupled thereto an inductor core 14 as shown for increasing the inductance thereof. Capacitors 15 are connected between adjacent inductors in the chain to ground conductor 23. Termination impedances 19 and 21 are connected across the delay line at opposite ends thereof, thus completing the delay line.

It has been found to be advantageous to use terminal inductors 17 and 18 having approximately one-half the inductance of inductors 13 for terminating the inductor chain. Also, it has been found to be desirable for termination impedance 19 and 21 to approximately equal the characteristic impedance of the delay line in order to prevent the occurrence of reflected waves in the line.

Ground conductor 23 of the delay line couples magnetic cores 25 to the line by threading the cores, one core per section. Sense conductor 27 is threaded successively through each of the core elements and is serially connected to sense line output impedance 29 across which is connected sense amplifier 31. Enable-write driver 35 is connected amross terminating impedance 19 and information signal driver 33 is connected to the line across terminating impedance 21 as shown. Read-out driver 37 is additionally connected to the line across terminating impedance 19. Switching conductor 26 threads all the cores; individual windings 28 also thread the cores, one winding per core. Thus, in this invention, the necessary inductance for the delay line is provided by separate inductors 13, 17, 18 which are independent of the storage means, i.e., cores 25, for example.

By divorcing the inductance-providing function from the information storage function, the subject invention makes possible a more simple and flexible control of each. As a feature of the invention, the inherent inductance of the core may be made small in comparison to the major delay line inductance, thereby preventing the induction of spurious signals in the delay line and the imposition of disturbance on the delay line when the cores are set or reset. Separation of the inductance elements from the storage elements also permits a reduction in the number of winding turns on the storage elements, with an increase in circuit inductance if desired. This separation further permits the use of a core or number of cores of a suitably high permeability material for controlling the inductance of the signal storage means. The use of separate inductance elements further permits the use of non-magnetic storage elements (the only restriction on the storage elements being that they have a defined threshold in their response to input signals). Many electrically responsive storage means which would introduce only negligible inductance for the delay line circuit can, therefore, be used in the subject memory apparatus as a result of the use of independent inductor elements.

Information signals may be entered into the memory device of FIG. 1 for storing information bits in several ways. By one method, information signals are impressed upon the delay line from driver 33 and an opposite polarity write-enabling signal is impressed upon the other end of the line from enable-write driver 35. The magnitude of the enabling signal and of each of the information signals is less than the magnitude required to switch any of the magnetic core elements 25. The combined effect of the write-enabling signal and the information signals, however, when they coincide at any of the cores, must be sufficient to cause that core to be switched.

The enable-write gating signal and the information signals propagate along the line toward each other at the same rate of speed and set each core at which the write-enabling current pulse coincides with an information representing signal pulse. The information signal pulses are separated by a period of time which is double the amount of time required for signals to pass from one core to another, or from one section of the delay line to another. This time-spacing between information signals is necessary to cause the write-enabling signal and the information signals, which propagate along the line at the same rate of speed, to arrive in position to coincide at successive cores along the line. The point of coincidence of the write-enabling signals and the information signals then progresses along the delay line at the rate determined by the propagation characteristics of the line.

By another method of writing information bits into the storage device of FIG. 1, information signals are impressed upon the delay line across termination impedance 21 and the enable-write signal is applied to the cores on switching conductor 26 or on individual windings 28. If the information signals are separated by a double time-period as described above, then a series of single-spaced enable-write pulses must be applied to the storage elements either on conductor 26 or on windings 28. If the information signals are spaced by single delay line unit periods or intervals, then a single enable-write pulse is applied to conductor 26 or to windings 28 at the point in time at which the information pulses all arrive at their respective storage locations.

Information signals may also be entered into the memory for storage by applying them directly to individual windings 28, either simultaneously or successively, for switching the selected cores from one state of magnetic remanence to the other.

Read-out of the stored signal representations is effected by resetting the switched cores. This is accomplished by impressing a read-out signal of full switching magnitude upon the line from read-out driver 37. This signal propagates along the line at the rate determined by the amount of inductance and capacitance in the line. As the current pulse from the read-out driver reaches a magnetic core, the core will be switched if it had stored a bit of information. The switching of a core induces an output signal on sense line 27 which causes an output signal to appear across impedance 29 at the inputs to the sense amplifier. The output signals also become available on individual windings 28 from which they may be sensed as they successively appear.

The read-out current pulse continues along the line at the delay line characteristic rate of speed, switching successively each of the cores coupled to the line and produces an output signal on the sense conductor for each of the cores 25 which had been switched or set for the storage of an information bit. The output signals may be taken across sense line output impedance 29 or from individual core windings 28 as they appear in sequence. The output signals appear serially on the sense line and sequentially on individual windings 28.

Figure 8:
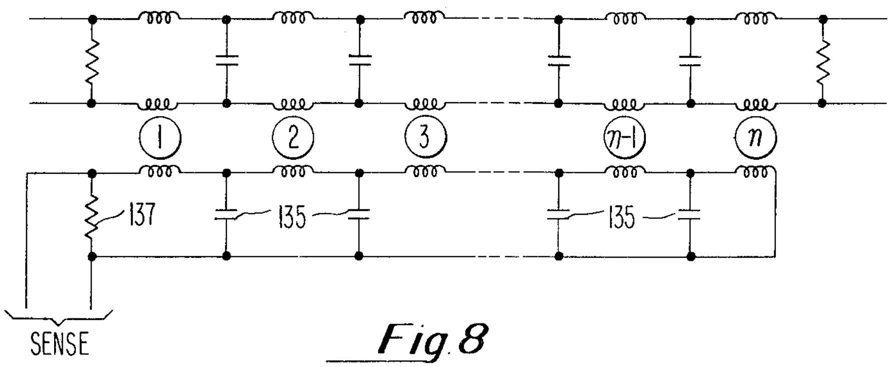
FIG. 8 is a general schematic illustration of the memory apparatus showing a sense circuit modifications.

Read-out of the delay line may also be accomplished by impressing the read-out signal upon conductor 26 and taking the output signals from individual windings 28. Also, if delay elements are incorporated into the sense line as shown in FIG. 8, then the cores may be readout by pulsing switching conductor 26 or by simultaneously pulsing individual windings 28 and detecting the output signals as displayed by and transmitted along modified sense line 127'. If the read-out signals is applied to switching conductor 26, then output signals can also be taken from individual windings 28.

A lumped constant delay line memory device similar to that illustrated in FIG. 1 and incorporating ferrite cores having an interior diameter of 50 mils and an outside diameter of 80 mils has been built and tested. The line incorporated eight such ferro-magnetic cores in eight sections, each section having a propagation relay of approximately 0.55 micro-second, the total line delay being approximately 4.4 micro-seconds. The delay line inductors were 27 micro-henries each and the terminal inductors were each 13.5 micro-henries. Capacitors 15 were each 0.01 micro-farad, and the terminating or load impedances 19 and 21 were 52 ohms each. The characteristic frequency of this line was approximately 613 kilocycles. The sense line output impedance employed was a 90 ohm resistor which produced a 0.3 volt output signal.

Full select current for the magnetic cores employed was approximately 500 milli-amperes. Writing on the line was accomplished by coincidence of a 250 milli-ampere enable-write current pulse with a train of 250 milli-ampere information current pulses at the selected cores. The information signal pulses in the train were separated by periods of approximately one micro-second.

The read-current applied to the line was approximately 1.5 amperes, which was applied as a pulse of approximately 1 micro-second duration. The output pulses appeared on the sense line separated by the 0.55 micro-second characteristic delay period of the delay line sections. The characteristic rise-time of the delay line was approximately 1.16 micro-seconds.

The delay line necessary for this invention may be any type of delay means which is capable of displaying and transmitting a series of information signals, and along which memory devices may be coupled for accepting and storing the information signals presented therein. The storage devices may be any bistable elements which have a threshold in their response to input signals, thus requiring a signal strength of a specified minimum magnitude for storing signal representations. Various bi-valued magnetic remanence devices such as the torroidal magnetizable cores here employed for example, may be used with many types of delay means such as lumped constant, distributed parameter, and hybrid electrical delay lines. The bi-level magnetic remanence transducers may also be employed with electromechanical delay means, including magnetostrictive, "sonic," and "acoustical" delay lines.

The phenomenon of magnetic domain "rotational" switching, as used for example, in magnetic thin-film and "twistor" devices, may also be employed with various electrical delay means for practicing this invention. This recently developed improved magnetic storage technique utilizes and requires very thin magnetic films of less than a certain critical thickness which is dependent upon the magnetic material utilized. In these magnetic thin-films, the magnetic domains are oriented and made uniform during fabrication into a preferred or "easy" axis of magnetization. Information signals are stored by applying magnetomotive force to the magnetic material for rotating the magnetic domains from one direction along the "easy" axis to the reverse or opposite direction along that axis. The primary advantage of magnetic thin-film storage is increased speed of switching, which is a function of magnetic domain rotation as opposed to magnetic domain wall motion and results in part from a significant reduction in eddy currents in the material. Further advantages of magnetic thin-film storage are increased frequency response and reduction in the physical bulk and cost of memory devices. Reference is made to pp. 26–27 and 435–443 of Digital Applications of Magnetic Devices, Meyerhoff et al., published by Wiley & Sons (New York, 1960) for further explanation of thin-film switching techniques.

Figure 2:
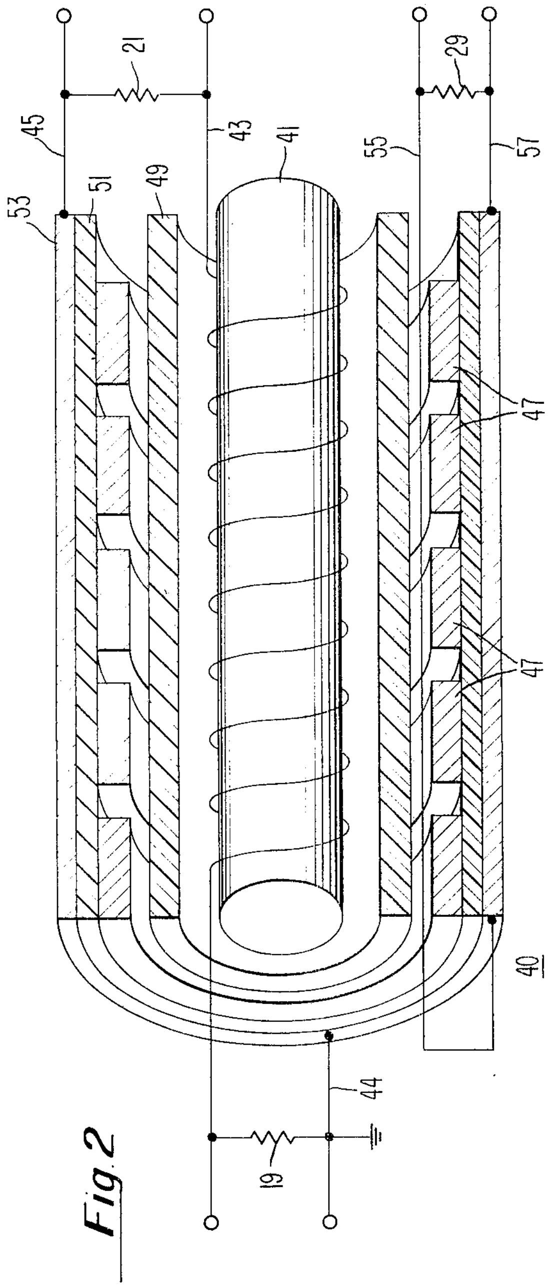
FIG. 2 is a longitudinal cross-section of the preferred embodiment of the invention.

Referring now to distributed parameter electrical delay line 40 illustrated in FIG. 2, a ferromagnetic core 41 is wrapped with or inserted into a conductor coil 43 for providing the inductance required for the delay line circuits. This wound assembly is positioned within circular magnetizable bands 47 and separated therefrom by cylindrical dielectric layer 49. This coaxial assembly is then placed within cylindrical conductive layer 53 and separated therefrom by cylindrical dielectric layer 51. The dielectric layers may be eliminated if desired, so long as a spaced is maintained between the adjacent conductive elements.

A grounded conductor 44 is connected to outermost conductive layer 53; terminating impedance 19, across which the enable-write gating pulse is applied, connects this conductor with conductor coil 43. Conductor 45 is connected to the opposite end of cylindrical conductor 53 and is coupled to conductor coil 43 by terminating impedance 21, across which the information signals are impressed. Sense line conductor 55 is threaded between magnetizable elements 47 and coil conductor 43 and connects with the outer cylindrical conductor 53. Conductor 57 is connected to cylindrical conductor 53 and is coupled to sense line 55 by sense line output impedance 29.

The information signal bits are stored in the magnetizable bands 47. By suitable adjustment of the spacing of the information pulses, of the timing relationship of those pulses with the enable-write pulse, and of the inductance and capacitance per unit length of the delay line, every available location in the magnetizable material can be used for the storage of information signals. Fully selective inductance per unit length of the delay line device being provided in this invention, as well as controllable capacitance, the density of storage attainable in the device approaches the limit of the material as to its capacity to support closely spaced adjacent discrete areas of different magnetization. Thus, several storage locations may be designated and utilized in each of the magnetizable bands 47. Alternatively, the magnetizable material may be shaped as a sleeve extending along the entire length of the delay line means, locations being selected along it for storing the information signals.

In the apparatus of the present invention the information signals may be stored by magnetic domain wall motion or by rotation of oriented magnetic domains in a magnetic thin-film. In contrast to the prior art apparatus illustrated in the previously referred to Loeber Patent No. 3,143,728 which made no showing or even suggestion of operation by magnetic thin-film switching, either of the embodiments of this invention shown in FIGURE 2 and FIGURE 3 hereof may utilize thin-film switching. The magnetizable bands 47 or an equivalent sleeve in the FIGURE 2 embodiment and the magnetizable laminae 63 and 65 of the FIGURE 3 embodiment may each be magnetically oriented thin-films in keeping with this invention or they may be layers of square hysteresis loop magnetic material if that is desired.

The delay line storage apparatus illustrated in FIGURE 2 is operated in the same fashion as the lumped parameter memory apparatus of FIGURE 1. Information signals are applied across terminating impedance 21 and opposite polarity write-enabling signals are applied across terminating impedance 19 at the other end of the device for achieving serial recording of information signals in the magnetizable element 47 of the memory device. Read-out signals are applied to the device across terminating impedance 19. These read-out signals initiate a series of output signals on sense line 55, which appear as voltage pulses across sense line output impedance 29.

A distributed parameter delay line memory device as shown in FIGURE 2 was constructed. This line was approximately 10 inches long and had an outside diameter of approximately ¾ of an inch. The characteristic imepdance of the line was approximately 50 ohms. The propagation delay per inch range was 1 to 2 micro-seconds, depending upon the frequency of operation. The magnetic material employed required delay line current pulses of approximately ½ ampere. The line was built and the characteristic inductance, resistance, and capacitance were measured. The inductance-shunting capacitance and capacitance-shunting conductance were also measured. These values were used for calculating the magnitude of the delay and the attenuation and characteristic impedance of the line, as a function of frequency. It was found that the delay line was useful for operation at frequencies up to about 3 megacycles per second.

At 1 megacycle, the line delay was approximately 1.44 micro-seconds, attenuation was 0.156, and the characteristic impedance was approximately 55.6 ohms, 0.15 microfarad. It was found that 14 bits could be readily stored in this 10-inch long distributed parameter delay line memory device and that read-out of the entire line could be accomplished in approximately 1.4 micro-seconds. The output pulses generated were spaced apart by approximately 0.1 micro-second.

The attenuation inherent in the delay lines utilized in the invention was compensated for by employing adequately large signals so that the enabling and information signals in combination, and the read-out signal in and of itself, would switch any selected memory element or elements coupled into the delay line.

Figure 3:
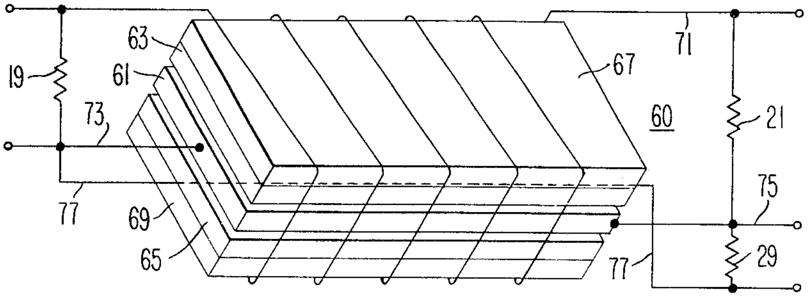
FIG. 3 is an isometric view of a further embodiment of the invention.

FIGURE 3, briefly mentioned hereinfore, illustrates a laminated embodiment 60 of the invention in which a conductive layer 61 is sandwiched between ferromagnetic layers 63 and 65. This assembly is then placed between dielectric layers 67 and 69 and the laminated structure is then wrapped by or inserted into coil conductor 71 for completing this distributed parameter delay line storage device.

Ground conductor 73 is attached to one end of central conductive layer 61 and is coupled to one end of coil conductor 71 by terminating impedance 19. Ground conductor 75 is attached to the other end of conductive layer 61 and is coupled to the other end of coil conductor 71 by terminating impedance 21. Sense conductor 77 is connected to ground conductor 73, is passed around one of magnetic layers 65, 67 as shown, and is connected to ground conductor 75 by sense line output impedance 29.

This sandwiched or laminated distributed parameter delay line is operated similar to the co-axial delay line configuration of FIGURE 2. Information signals are applied across terminating impedance 21 and a timed enable-write signal is applied across terminating impedance 19 for writing information into the device. The device may be utilized for storing any number of binary information signals. The number of signals stored and the position of storage of each bit along the distributed parameter device of FIGURE 3 is determined by the magnitude of the propagation delay of the fabricated structure and upon the allowable frequency rate of the applied information signals. As the propagation delay is increased, the information signal frequency can be decreased, or the number of information signals to be stored can be increased, or both. Information is taken form the storage device by applying a full magnitude read-out signal to the coil conductor at either terminating impedance. Output signals appear on sense conductor 75 and may be taken from across sense line output impedance 29.

Figure 4:
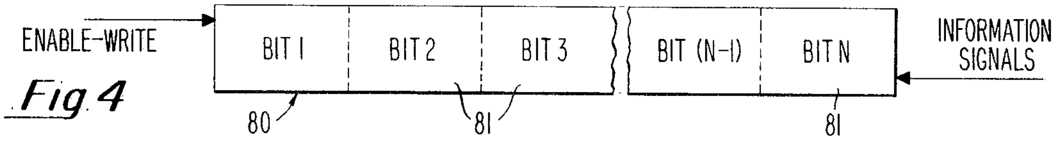
FIG. 4 is a generalized block diagram of the memory apparatus of the subject invention.
Figure 4A:
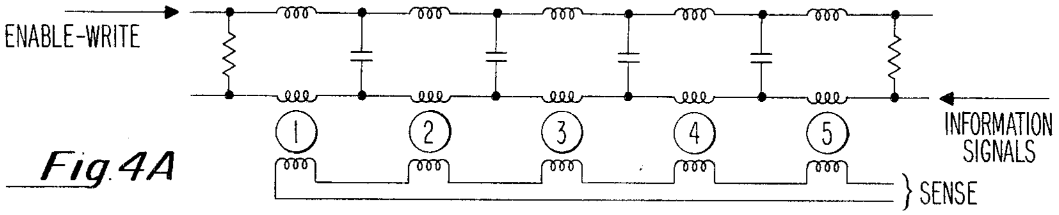
FIG. 4A is a generalized schematic diagram of the memory apparatus, both of these figures illustrating the application of enable-write and information signal pulses to the apparatus.
Figure 5:
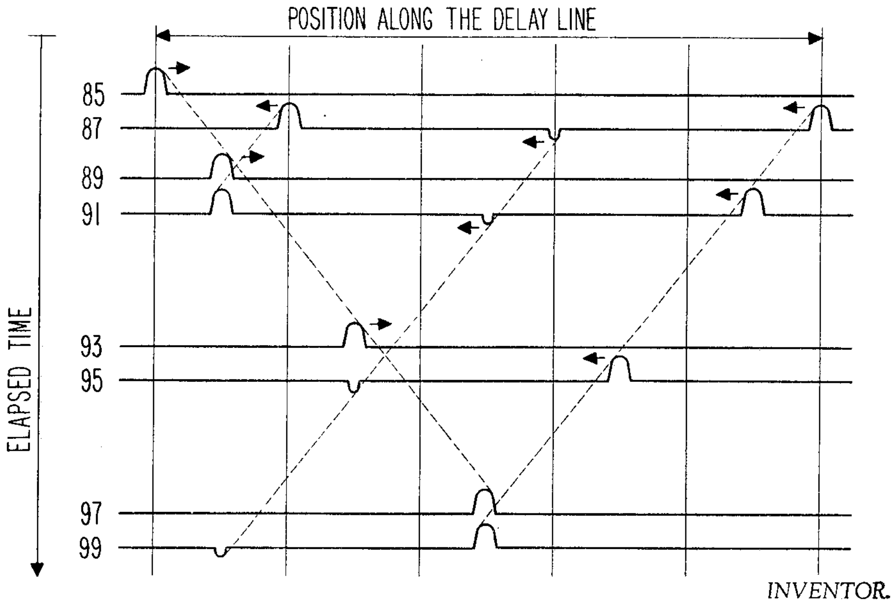
FIG. 5 is a timing diagram illustrating the position along the delay line of enable-write and information signal pulses at successive points in time during the writing of information signals.

FIGURES 4, 4A and 5 illustrate the manner by which information is serially written into or recorded in the static storage delay line memory devices constructed in accordance with the subject invention. Block diagram 80 of FIGURE 4 illustrates that an enable-write signal and the first of a train or series of information signals are simultaneously applied to opposite ends of a delay line along which is coupled ferromagnetic material for recording signal representations.

FIGURE 4A is a generalized schematic diagram of a static storage delay line memory device having five storage locations spaced along the delay line for recording a series or train of five binary information signals. As indicated on the diagram, half-select enable-write current pulses are applied at one end of the delay line to one of the line conductors and half-select information signals are applied to the other delay line conductor at the opposite end of the line. The delay line apparatus is completed by the additon of serially connected sense windings on each of the magnetic bistable elements of the memory device as shown.

FIGURE 5, which is an idealized diagrammatic set of curves, illustrates the successive positions along the delay line of FIGURES 4 and 4A at which information signals applied to the right end of the delay line will arrive at successive points in time designated 87, 91, 95 and 99. In this diagram, the presence of an information signal is shown as a positive-going pulse. The absence of an information signal at a position in the series of train is illustrated by a small amplitude negative-going signal. As shown by lines 85 and 87, an enable-write pulse is applied to the left end of the delay line when the first information pulse of the train is one-half delay line "section" away from the first storage location (labeled "1" in FIGURE 4A). At the instant of application, the enable-write signal applied to the delay line is also one-half section away from the first bistable memory element as shown. These converging signal pulses are shown in lines 85 and 87 of the diagram. The arrows adjacent to each of the pulses indicate their direction of propagation along the line.

Lines 89 and 91 illustrate the pulse positions along the delay line memory device at which the signals will have arrived after elapse of sufficient time for the signals to have advanced one-half section in the delay line. Since an enable-write signal and an information signal had each been one-half section away from memory element 1 and were converging toward each other in lines 85 and 87, they will coincide in the winding of that magnetic element at this later point in time. The converging pulses shown at 85 and 87 are therefore shown to have arrived at the same location in the delay line in lines 89 and 91 of FIGURE 5. These pulses, neither of which being of sufficient magnitude itself to switch a memory element, combine together upon coincidence and provide a sufficient current to switch the memory element at the point of coincidence in the line. At the instant shown in line 91, each of the signals appearing in the information signal pulse train have traveled one-half section in the delay line and are thus shown displaced in the direction of travel by one-half section.

After the signals in the delay line have traveled or propagated from one delay line section to an adjacent section, the enable-write signal will coincide with the next pulse position in the information signal pulse train at the next adjacent storage location. The enable-write signal applied to the line will have traveled from memory element 1 to memory element 2, and therefore, is shown displaced in line 93 by a space corresponding to one delay line section from its earlier position illustrated in line 89. Similarly, line 95 shows the information signals displaced by the space of one delay line section from their prior positions shown in line 91. Lines 93 and 95 show the enable-write signal pulse coinciding adjacent memory element 2 with an absent (or zero-indicating) information signal. Coincidence of the enable-write signal with an information signal-train position at which no information pulse appears will fail to set or switch the memory element at that location and memory element 2 will therefore not be switched.

Lines 97 and 99 indicate the position of the enable-write and the information signals after the elapse of an additional delay line section time period. At this point in time, the enable-write pulse has traveled the distance along the line from memory element 2 to memory element 3 and an information pulse signal has likewise traveled one delay line section along the line in the opposite direction. These signals coincide at memory element 3, which is therefore switched. Other information signals appearing in the information signal pulse train are also shown displaced from their immediately prior positions which were shown in line 95.

It is important to note that the timing diagram of FIGURE 5 and the above explanation relate to both sectional delay lines and to distrubted parameter delay line memory devices of the types shown in FIGURES 2 and 3 as well. In the distributed parameter delay line storage devices of FIGURES 2 and 3, the storage apparatus may be separate elements or may be a continuous storage means located along the delay line. In a distributed parameter memory apparatus having separate storage elements coupled thereto, any number of signal representations may be stored in each of the elements. In a memory device having a continuous storage means coupled thereto as in FIGURE 3, the signal representations are stored along the length of the memory structure in discrete areas as close to each other as desired, within the capability of the material utilized. The amount of inherent propagation delay in the device and the amount of physical separation desired between adjacent signal storage positions must be considered in determining signal storage positions in the line. Once the number and position of signal storage locations along a distributed parameter delay line are established, the explanation relating to FIGURES 4, 4A and 5 is applicable to the distributed parameter static delay line storage means of FIGURES 2 and 3 as well as to the lumped parameter embodiment illustrated in FIGURE 1.

Figure 6:
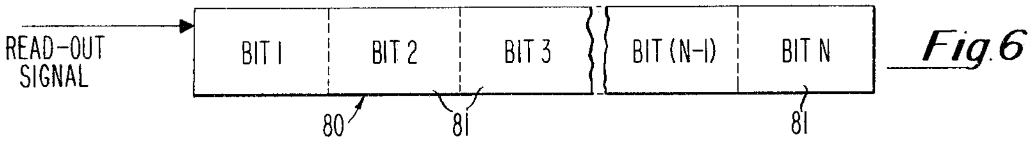
FIG. 6 is a block diagram of the subject memory apparatus.

FIGURE 6 illustrates a delay line memory apparatus 80 in block diagram form, having sections or assigned memory storage positions 81 to which a read-out signal may be applied at either end. As illustrated, the signal is applied at the left end of the delay line. FIGURE 6, illustrating the delay line memory device in a generalized schematic diagram, shows the application of a read-out current pulse to one end of a delay line consisting of five memory storage positions. Serial output signals representing the stored information appear on the sense line which couples each storage element as illustrated.

Figure 7:
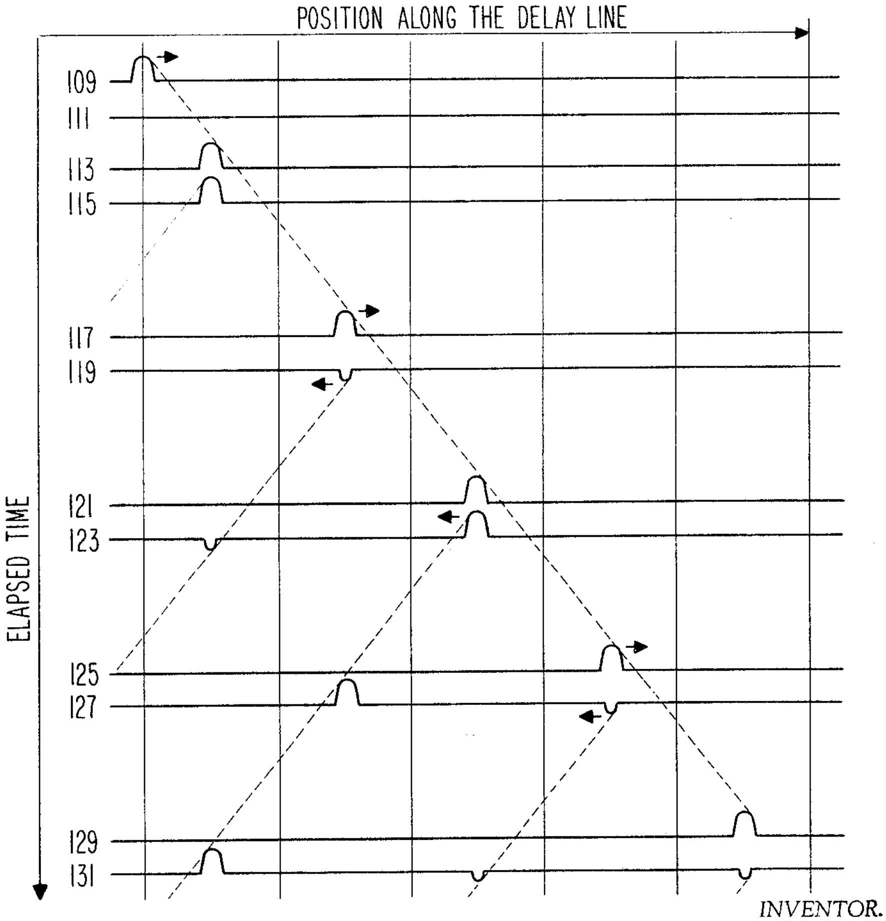
FIG. 7 is a timing diagram illustrating the position along the delay line of a read-out pulse and the resulting output signals at successive points in time after the application of the read-out signal.

The timing diagram of FIGURE 7 illustrates the positions along the delay line of the read-out signal and the induced output signals from the storage positions. Lines 109 and 111 indicate that at the instant of the application of the read-out signal no output signal is developed. No signal therefore appears on line 111.

Lines 113 and 115 illustrate signal positions along the delay line after the expiration of one-half section propagation delay period. The read-out signal has propagated from its position illustrated in line 109 to the winding adjacent memory element 1, one-half delay line section removed, and will therefore reset that element if it contained an information representation. Resetting memory element 1 induces an output signal on the sense line at that point of time as illustrated by line 115.

Lines 117 and 119 illustrate pulse positions in the delay line after the elapse of a period of time corresponding to one unit of delay in the line. At this point of time the read-out signal has traveled to memory element 2 and since no signal representation had been stored therein, no output pulse is induced on the sense line. The absence of an output signal in the diagram of FIGURE 7 is illustrated by a small negative-going signal as in FIGURE 5.

After the elapse of a further unit of time, the read-out signal will have propagated from memory element 2 to memory element 3, and will cause that element to be reset and therefore read-out a signal representing the storage of a bit of information if it had been previously set. The read-out pulse is therefore shown aligned with storage element 3 in line 121, and an output pulse is shown in the same position on line 123.

Figure 6A:
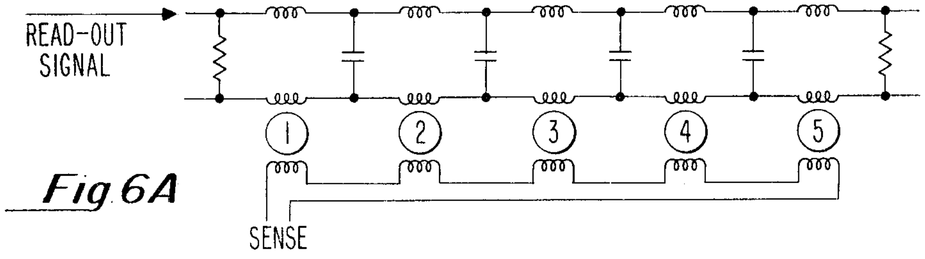
FIG. 6A is a generalized schematic illustration of the invention, both figures showing the application of a read-out pulse to the memory apparatus.

Lines 125 and 127 illustrate the arrival of the read-out pulse at the subsequent storage location or position designated element 4 in FIGURE 6A. Line 127 indicates that no signal was stored therein and that no output signal was developed on the sense line upon the arrival of the read-out signal.

Lines 129 and 131 indicate the arrival of the read-out signal at the last storage position in the delay line of FIGURE 6A. Since no information signal was stored therein, no output signal is developed when it is pulsed by the read-out signal.

It should be noted that the output pulses appearing on the sense line as a result of the application of the read-out signal will be separated in time by the amount of time required for the read-out signal to travel between signal storage positions in the line. The output of the sense line therefore will be a succession of pulses with positions corresponding to each of the signal storage locations along the memory delay line.

If it is desired to expand the time separation of the output pulses, delay elements may be connected into the sense line as illustrated in FIGURE 8. The combination of the winding inductance and of capacitors 135 coupled into the sense line as illustrated, causes the sense line to exhibit the characteristics of a delay line. These elements delay the output pulses by different amounts which correspond to the position at which the storage locations are coupled with the sense line.

Since the read-out scheme of this invention is destructive and the memory elements are reset by the read-out signal unless special storage means are utilized, it may be advantageous to insert the information signals back into the line after read-out is obtained. For re-insertion of the information signals into the memory, it is necessary to expand the time separation between the output pulses to correspond to the time separation between the pulses in the original information signal train. The time separation between output pulses may be expanded to correspond to the time separation between the original information signal pulses if the delay line sections in the sense line provide approximately the same amount of delay as the sections of the main delay line of the memory device. The result is an output pulse train expanded in time and substantially identical to the pulse train of the original information signal.

Figure 9:
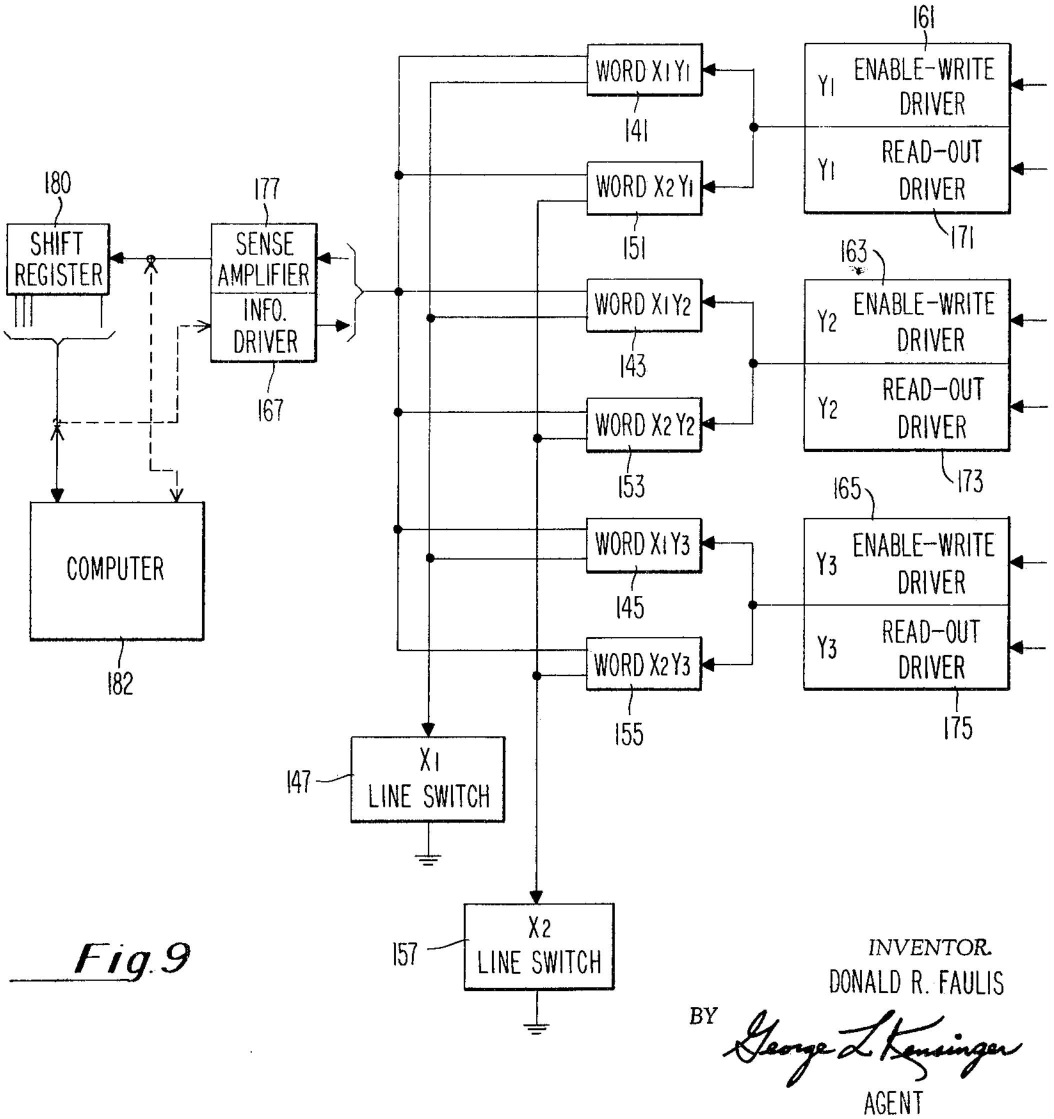
FIG. 9 is a block diagram of a memory system incorporating the improved memory apparatus of the subject invention for storing information in association with a computing device.

FIGURE 9 illustrates in block diagram form a memory system incorporating the improved memory apparatus of the invention for storing information signals in a computing system. Static delay line memory devices 141, 143 and 145 are each connected to $X_1$ line switch 147, and memory devices 151, 153 and 155 are each connected to $X_2$ line switch 157. Each memory device is capable of storing one word" or series of information signals. An enable-write driver and a read-out driver are both connected to each of a pair of the memory devices as illustrated by the connection of enable-write driver 161 and read-out driver 171 to memory devices 141 and 151. The memory device to be operated by one of the drivers is selected by closing either switch 147 or 157, thus completing a circuit to one device of the selected pair of memory devices.

Enable-write driver 163 and read-out driver 173 are similarly connected to memory devices 143 and 153. Enable-write driver 165 and read-out driver 175 are connected to memory devices 145 and 155.

All of the memory devices are also connected to information driver 167 and to sense amplifier 177. Information is written or recorded in one of the memory devices by closing one of the switches 147, 157 and by activating one of the enable-write drivers 161, 163, 165 in appropriate time sequence with an information signal pulse train applied by information driver 167. The closing of one of switches 147, 157 and the selection of one of the enable-write drivers, determine into which memory device the information signals from information driver 167 are recorded. The information signals may originate in a computer 182 or a shift register 180, as illustrated.

The memory devices shown in FIGURE 9 are interrogated by initiating one of the switches 147, 157 and activating one of the read-out drivers 171, 173, 175 to pulse one of the devices. The output from the selectively pulsed memory device passes to sense amplifier 177 and may be delivered directly to computer 182 or to shift register 180. If desired, the output signals which are applied to the shift register may be reapplied to information driver 167 in preparation for re-insertion into one of the memory devices.

Further economy and simplicity may be achieved in the subject delay line memory system by storing more than one word or series of information pulses in each memory device. Sufficient storage elements should be coupled into each delay line for storing the required total number of information bit pulses. The words may be recorded in the device in a single chain or may be entered at different times. The reduction of cost due to minimization of input and output amplifiers increases with the length of the memory devices used. The length of the memory devices is limited by the inherent attenuation of the delay lines employed and by the frequency response of the delay lines and drivers employed.

If it is desired to non-destructively interrogate selected words from a memory system incorporating multi-word memory devices, then a re-insertion means must be included since read-out in the subject invention is destructive of the signal-storing states. In such a multi-word storage system, the entire memory device contents are read out of the selected device and the words or information signal chain is written back into the device.

The foregoing description and explanation is by way of illustration only. Applicant's invention is defined and limited only by the following claims which particularly point out and distinctly claim applicant's invention.

I claim:

1. A method of writing information signals into static storage memory apparatus including a delay line to which storage means having regularly positioned storage locations is coupled comprising:

generating a regularly spaced series of partial-select current pulses which are position representative of the information bits to be stored, impressing said regularly spaced information pulse series upon said delay line to identify the locations at which information representations are to be stored, and applying an enable-write control pulse to each of the storage locations coincident in time with the appearance of information pulses at the respective storage locations, the coincidence of information and control current pulses in the delay line adjacent any storage location being sufficient to switch that storage location.

2. The method of claim 1 wherein the generation of information pulses provides separation between successive pulses of a time period substantially double the transit delay between adjacent storage locations, and the enable-write control pulse is applied to the storage locations by being impressed upon the delay line at a point remote from the point at which the information pulses are impressed.

3. A method of storing information signals in static storage memory apparatus in which storage means are distributively coupled to delay line means at least at regular intervals comprising the steps of:

forming a train of information current pulses of less than switching magnitude in which the pulse positions are spaced apart by a time period substantially double the transit delay between adjacent storage locations along the line, impressing said information pulse train upon one end of the delay line, and impressing a single enable-write current pulse upon the other end of said line in timed relationship with said information pulse train so as to coincide with the information pulses at positions in the delay line adjacent selected storage locations and switch the selected locations.

4. In a process for writing information signals into selected storage locations of memory apparatus incorporating delay line means along which is coupled multiple-location storage means, the improvement comprising:

generating a series of substantially half-select current pulses representative of the information to be stored, adjacent information bit pulses being separated by an interval substantially double the transit period between adjacent storage locations along the delay line, impressing said information pulse series upon one end of the delay line, generating an enabling pulse of at least half-select current magnitude, and impressing the enabling current pulse upon the other end of the delay line at the point in time at which the first of the information pulses in the delay line, if present, and the enabling pulse at the point of application, would be equidistant from the storage location nearest said other end of the delay line.

5. In an apparatus for statically storing multiple information bit signals including a delay line to which is coupled storage means having regularly positioned storage locations, the invention comprising:

means for generating a series of regularly spaced partial-select current pulses which are position representative of the information bits to be stored, the spacing of said current pulse series being proportional to the spacing of said storage locations along the delay line;

means for impressing the current pulse series upon said delay line to specify the locations at which information is to be stored; and means for applying a partial-select enable-write control pulse to each of said storage locations coincident in time with the appearance of the information bit pulses thereat, said pulse coincidence at any storage location being sufficient to switch that storage location.

6. The invention of claim 5 wherein the information current pulse generating means produces pulses separated in time by an interval substantially double the amount of the transit delay in the delay line between adjacent storage locations, and the control pulse applying means includes means for impressing said pulse upon the delay line at a point remote from that at which the information pulses are impressed.

7. The apparatus of claim 5 in which a sense means having a plurality of serially connected delay elements is coupled to the storage means, each of the storage locations being individually coupled to the sense means between adjacent delay elements therein.

8. The apparatus of claim 7 wherein the sense means is comprised of a circuit including a plurality of serially connected windings coupled to the storage means at each storage location, shunted by capacitive means coupled between adjacent windings therein.

9. A memory apparatus for statically storing information signals comprising:

a delay line, threshold responsive storage means operatively coupled at least at regular intervals to said delay line and responsive to signals propagated along said delay line, means for forming and impressing upon the delay line a train of current pulses which are position representative of said information signals and of less than threshold magnitude to partially select the locations at which information is to be stored, the pulse positions being spaced apart by an interval proportional to the transit period between adjacent storage locations along the line, and means for generating and applying to said storage means an enable-write control signal also of less than threshold magnitude and coincident in time with the appearance of the information pulses at the storage locations, the information pulses and control signals together exceeding the storage means threshold level upon coincidence in the delay line adjacent a storage location.

10. The memory apparatus of claim 9 in which the current pulse train forming means generates pulses spaced apart by an interval substantially double the transit period between adjacent storage locations along the delay line, and the enable-write control signal generating means impresses the control signal upon the delay line at a point remote from the point of application of the information pulse train.

11. The memory apparatus of claim 9 characterized in that the storage means is comprised of bistable magnetizable means and the delay line is comprised of lumped parameter sections in which is utilized inductor means independent from said storage means.

12. The apparatus of claim 11 in which the storage means includes magnetic cores regularly positioned along and coupled to said delay line, and the inductor means includes magnetic core means for regulating the inductance thereof.

13. The memory apparatus of claim 10 characterized in that the storage means is comprised of bistable magnetizable means and the delay line is comprised of coiled conductor means capacitively and magnetically coupled with said magnetizable means.

14. The apparatus of claim 13 wherein the coiled conductor means is positioned interially of substantially closed cylindrical magnetizable storage means.

15. The invention of claim 14 in which the coiled conductor means is magnetically coupled to ferromagnetic means and the magnetizable storage means is substantially encircled by and insulated from a conductive sleeve.

16. The invention of claim 15 wherein the magnetizable storage means is comprised of a substantially closed cylindrically shaped magnetically oriented thin-film member.

17. The apparatus of claim 13 wherein the coiled conductor means encircles the bistable magnetizable means.

18. The invention of claim 17 in which conductive means is insulatably positioned adjacent the magnetizable means and is insulatably encircled by said coiled conductor means.

19. The invention of claim 18 wherein the magnetizable storage means is comprised of at least one lamina of a magnetically oriented thin-film.

20. A static storage memory device for receiving and storing information-representing electrical signal pulses comprising:

an electrical delay line comprised of at least one coiled conductor means magnetically coupled about a core of ferromagnetic material of selected permeability and having shunting capacitance distributed along the device, and a magnetizable signal storage means positioned along and coupled to said delay line at least at regular intervals for storing information signals impressed upon said delay line.

21. The static storage memory device of claim 20 wherein the storage means includes a plurality of spaced apart magnetic storage elements and the coiled conductor means presents greater inductance in the delay line circuit than does the storage means.

22. The memory device of claim 20 wherein the storage means is constructed of at least one anisotropic magnetic thin-film body.

23. The memory device of claim 20 wherein the signal storage means is constructed of at least one cylindrical body which encircles a portion of the coiled conductor means and its associated ferromagnetic core.

24. The invention of claim 23 characterized in that an outer conductive sleeve surrounds the storage means and is utilized as one conductor of the delay line employed, thereby electrically shielding the memory device.

25. A static storage memory device for receiving and storing electrical signal representations comprising:

a distributed parameter electrical delay line including coiled conductor means longitudinally surrounding an elongated conductor, and signal storage means lying between said coiled conductor means and said elongated conductor and magnetically coupled to one of them for storing information signals impressed upon the delay line.

26. The memory device of claim 25 wherein the signal storage means is constructed of at least one anisotropic magnetic thin-film body.

References Cited

UNITED STATES PATENTS

| | | | |
|---|---|---|---|
| 3,371,217 | 2/1968 | Flannery et al. | 307—88 |
| 3,435,431 | 3/1969 | Heckler et al. | 307—88 X |
| 2,979,700 | 4/1961 | Tellefsen et al. | 340—174 |
| 3,046,500 | 7/1962 | Dewitz | 340—174 X |

STANLEY M. URYNOWICZ, Jr., Primary Examiner